United States Patent [19]
Grabb

[11] 3,972,191
[45] Aug. 3, 1976

[54] BALANCED SERVOMOTOR VALVE

[75] Inventor: Frederick G. Grabb, South Bend, Ind.

[73] Assignee: The Bendix Corporation, South Bend, Ind.

[22] Filed: Aug. 11, 1975

[21] Appl. No.: 603,430

[52] U.S. Cl. .................................. 60/553; 60/592; 91/434
[51] Int. Cl.² ......................................... F15B 7/00
[58] Field of Search ............. 60/547, 553, 572, 592; 91/369 A, 391 R, 434

[56] References Cited
UNITED STATES PATENTS

| | | |
|---|---|---|
| 3,910,046 | 10/1975 | Gardner et al. ........................ 60/553 |
| 3,911,681 | 10/1975 | Sisco .................................. 60/553 |

Primary Examiner—Martin P. Schwadron
Assistant Examiner—H. Burks
Attorney, Agent, or Firm—Leo H. McCormick, Jr.; William N. Antonis

[57] ABSTRACT

In a servomotor having a first diameter piston concentric to a second diameter piston for supplying a braking system with a first pressurizing force and a second pressurizing force in response to an operator input. A transfer valve has a first face and a second face which are located on opposite sides of a radial bore in the second piston to receive a first pressurizing force. The transfer valve has an axial passageway therethrough which communicates relief or reservoir pressure to the first and second faces of the transfer valve to provide a balance pressure force on the same. A spring holds the second face of the transfer valve against a seat to prevent communication of the first pressurizing force into the relief chamber. When a predetermined first pressurizing force is obtained, the actuator in response to an operator will overcome the spring and move the second face away from the seat to allow the first pressurizing force associated with the first piston to be proportionally communicated into the relief chamber. As the first pressurizing force is communicated into the relief chamber, the output from the servomotor is transferred to the second piston to provide an additional operational or second pressurizing force to activate the wheel brakes of the vehicle.

8 Claims, 1 Drawing Figure

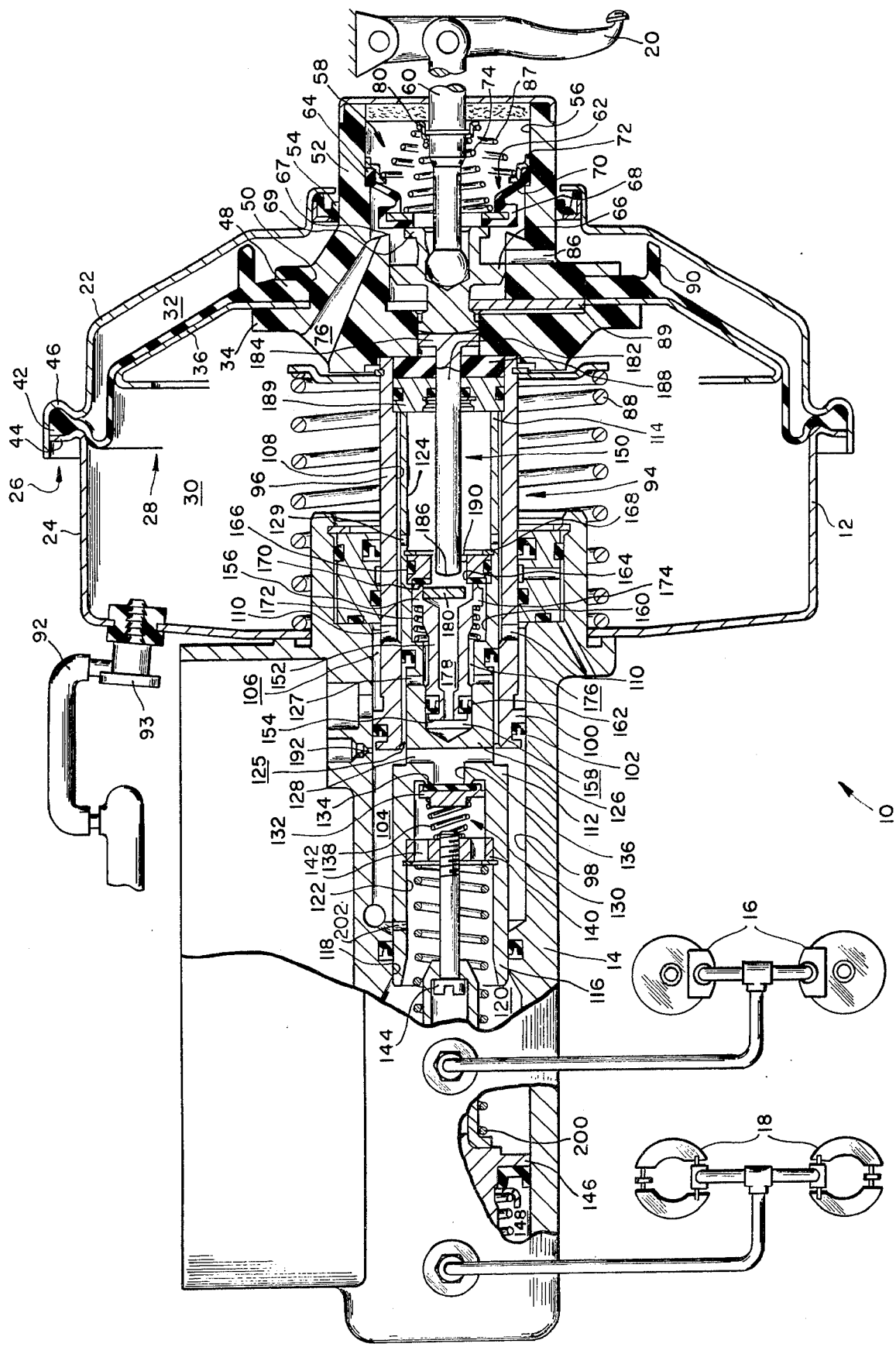

BALANCED SERVOMOTOR VALVE

BACKGROUND OF THE INVENTION

In copending U.S. Application Ser. No. 481,433, now U.S. Pat. No. 3,911,681 incorporated herein by reference, it is disclosed how a stepped diameter piston can sequentially produce a first pressure force and a second pressure force when a transfer control valve is operated by movement of a plunger connected to an input push rod. An output force is created in a servomotor by the development of a pressure differential across a wall. The stepped diameter piston is connected to the wall. When the transfer control valve is activated, the output force is shifted from the first diameter to the second diameter to produce an added output potential. However, in the event that the pressure differential across the wall does not develop, the transfer control valve directly shifts the input force from the first diameter to the second diameter completely eliminating the development of the first pressure force.

In copending U.S. Application 484,381, now U.S. Pat. No. 3,937,021 incorporated herein by reference, a hold-off means is disclosed for delaying the development of the second pressure force until the first pressure force reaches a predetermined value before the transfer control valve is activated by the input force. In this servomotor means, a stepped piston means divides the pressurizing chamber of the pressurizing mechanism into a first section and a second section. The first section is connected to a relief chamber through the transfer control valve. The relief chamber is connected to a reservoir through a flow path. A tilt valve means located in the flow path allows communication of fluid from the reservoir, when a stem thereon engages the stepped piston, and prevents communication of fluid from the relief chamber when the stepped piston disengages the stem. As the stepped piston moves in response to the input force, the first piston transfers fluid from the first section through the transfer control valve into the relief chamber. The hold-off means prevents any fluid from escaping from the relief chamber until the first pressure force reaches a predetermined value. This same first pressure force is simultaneously supplied to the wheel brakes. When the first pressure force reaches the predetermined value, the hold-off means releases fluid to the reservoir and permits the input force to act through that portion to provide an added output as a second pressure force for operating the wheel brakes. However, if the transfer valve is rapidly modulated, fluid from the second section will be transferred to the first section when the valve is released and afterwards released into the reservoir. This reduction in fluid from the brake system will allow the stepped piston means to contact the bottom of the bore in the second section before the optimum second pressure force is developed.

Later in copending U.S. Application 511,413, now U.S. Pat. No. 3,910,046 incorporated herein by reference, a control means is disclosed for adding compensatory fluid to the braking system to replace the fluid transferred to the relief valve during the transfer of the input force from the first diameter to the second diameter of the power piston. However, in such a device if the shift of the operational mode from the first diameter to the second diameter in response to the input force is transmitted in an oscillating manner a corresponding change in the displacement volume of the power braking unit will occur which may result in an inadequate quantity of hydraulic fluid to operate the power braking system.

SUMMARY OF THE INVENTION

I have devised a power braking apparatus having a first diameter piston means concentric to a second diameter piston means for transmitting an output force to a pressurizing means supplying an actuation force to wheel brakes in a braking system. The first diameter piston is fixed to the movable wall of a servomotor and extends into a first pressurizing chamber of the pressurizing means. The second diameter piston has a first end which extends into a second pressurizing chamber and a second end which abuts a reaction means confined in the movable wall. The second diameter piston has a first axial bore which connects the first pressurizing chamber with the second pressurizing chamber and a second axial bore which connects the first pressurizing chamber with a relief chamber. A first valve means is located in the first axial bore to only permit communication from the first pressurizing chamber to the second pressurizing chamber. A second valve means is located in the second axial bore and has a cylindrical body with a first face and a second face located on opposite sides of a radial bore in communication with the first pressurizing chamber. The cylindrical body has a passageway through which the relief chamber is communicated from the second face to the first face. A resilient means holds the second face against a seat on a stop to prevent communication from the relief chamber into the first pressurizing chamber. An actuator means has a plunger through which an operator controls the creation of a pressure differential in the servomotor which moves the movable wall therein. A stem which extends from the plunger into the second axial bore is held in axial alignment by the stop means. Upon actuation, a pressure differential in the servomotor will move the wall to correspondingly simultaneously move the first diameter piston and the second diameter piston in the first and second pressurizing chambers to develop a first pressurizing force for operating the wheel brakes. The first pressurizing force developed in the first pressurizing chamber is simultaneously transmitted through the first axial bore in the second diameter piston to the second pressurizing chamber and through the radial bore to the control chamber. The first pressurizing force acts on both the first face and the second face of the second valve means to balance the second valve means. When the pressure differential across the wall means reaches its maximum, additional input from the operator will move the stem into engagement with the second valve means to unseat the second face and proportionally allow the first pressurizing force to escape into the relief chamber. As the fluid from the first chamber is communicated into the relief the output force from the movable wall is transferred through the reaction means into the second diameter piston to develop a second pressurizing force in the second pressurizing chamber to activate the wheel brakes.

It is therefore the object of this invention to provide a two stage servomotor with a balanced control valve to provide a smooth transition when the operation is shifted from the first stage to the second stage.

It is a futher object of this invention to provide a control means for a servomotor having a first diameter piston which supplies a first fluid force through a second diameter piston to operate the wheel brakes in a balanced valve means activated by an input force from an operator to uniformly transfer the operational input force acting on the first diameter piston to a second diameter piston.

It is a further object of this invention to provide a servomotor with a first piston fixed to a movable wall and a concentric second piston connected to the wall through a deformable reaction member, the second piston being connected to an outlet pressurizing chamber to provide an operator with uninterrupted information with respect to the operation fluid force being supplied to the wheel brakes of a vehicle.

These and other objects will become apparent from reading this specification and viewing the drawing.

BRIEF DESCRIPTION OF THE DRAWING

The drawing is a schematic illustration of a power braking system with a sectional view of a two stage servomotor having a balanced valve means through which the output from a wall means is uniformly transferred from a first diameter to a second diameter piston.

DETAILED DESCRIPTION OF THE PREFERRED EMBODIMENT

The braking system 10, shown in the drawing has a fluid pressure servomotor 12 connected to a master cylinder 14 for supplying the front wheel brakes 16 and rear wheel brakes 18 with an operational hydraulic force in response to an input force applied to pedal 20 by an operator.

The fluid pressure servomotor 12 has a first shell 22 joined to a second shell 24 by a twist lock arrangement 26. A movable wall means 28 is located within the first shell 22 and the second shell 24 to form a first variable volume chamber 30 and a second variable volume chamber 32. The wall means 28 has a central hub 34 with a backing plate 36 extending therefrom. A diaphragm 40 has a first bead 42 on its periphery which is held between flange 44 and flange 46 on the first shell 22 and the second shell 24, respectively, and a second bead 48 which is snapped into groove 50 adjacent the backing plate 36.

The hub 34 has a rearwardly extending projection 52 which extends through opening 54 in the first shell 22. The projection 52 has an axial bore 56 into which a control valve means 58 is located and supplied with an operational input from pedal 20 through push rod 60.

The control valve means 58 has a poppet assembly 62 which is sequentially operated upon movement of a plunger 66 by the push rod 60 to interrupt vacuum and allow air to develop a pressure differential across the wall means 28.

The poppet assembly 62 has a face 68 which is separated from a fixed bead 64 by a flexible section 70. The bead 64 is retained within bore 56 by a retainer 72 which biases the bead 64 against the projection 52. A first spring 74 connected to shoulder 80 on push rod 60 urges the face 68 toward a vacuum seat 67 adjacent vacuum passage 76. The vacuum passage 76 connects the first chamber 30 with the interior bore 56 of the hub means 34. A second spring 87 urges the plunger 66 against stop 89 to allow vacuum to enter the rear chamber 32 through passage 86.

A return spring 88 located between the shell 22 and hub means 34 urges bumper 90 on diaphragm 40 toward shell 24. In this position, vacuum is communicated from the intake manifold through conduit 92 past check valve 93 into the front chamber 30 and will evacuate air from the second variable volume chamber 32 by flowing through passage 86 in bore 56 and out passage 76 to vacuum suspend the wall means 28.

A ratio changer means 94 has a first piston 96 which is fixed to the hub means 34 and extends into bore 98 of the master cylinder 14. A shoulder 100 on the first piston 96 has a diameter which substantially fills bore 98 and provides a support for seal 102 to segregate a first pressurizing chamber 104 from a relief chamber 106. The first piston has an internal bore 108 connected to the relief chamber 106 through a series of radial holes 110.

A second piston 112 has a first section 114 which is concentrically located within bore 108 of the piston 96 and a second section 116 which projects into bore 118 to form an outlet or second pressurizing chamber 120 in the master cylinder 14. The second piston 112 has a first axial bore 122 separated from a second axial bore 124 by a fixed separation wall 126. A first radial bore 128 connects the first pressurizing chamber 104 with the second pressurizing chamber 120 through the first axial bore 122. A groove 125, a second radial bore 127 and a third radial bore 129 connect the first pressurizing chamber 104 with the relief chamber 106.

A first valve means 130 is located in the first bore 122 for controlling communications between the first pressurizing chamber 104 and the second pressurizing chamber 120. The first valve means 130 has a disc 132 with a resilient surface 134 which is urged against a seat 136 by a spring 138. A retainer 140 has a series of openings 142 therein to allow fluid to flow in the first axial bore 122. A connector 144 joins the second piston 112 to piston 146 which pressurizes the fluid in chamber 148 for distribution to the rear wheel brakes 18.

A second valve means 150 is located in the second axial bore 124 for controlling communication between the first pressurizing chamber 104 and the relief chamber 106. The second valve means 150 has a cylindrical section 152 with a first end 154 and a second end 156 located in a first diameter section 158 and a second diameter section 160, respectively, of the second axial bore 114. A seal 162 is located in a groove adjacent the first end 154 to provide a first face for the second valve means 150 while an annular surface 164 forms a second face. The dimensional size of the first face and the second face are designed to be equal. A stop or sleeve means 166 which is retained in the second axial bore 124 by a snap ring 168 has a resilient surface 170. A resilient spring 172 acts on shoulder 174 to urge the annular surface 164 against the resilient surface 170 to prevent fluid communication from the control chamber 176 into the relief chamber 106. A passage 178 is located in the cylindrical section 152 connecting the fluid in the relief chamber 106 with the first face 154 of the second valve means. A bumper 180 which has a star shape will allow the fluid to be communicated into passage 178 without interruption.

The control valve or actuator means 58 includes a stem 182 which has a head 184 and a pointed end 186. The head 184 abuts the plunger 66 while the pointed end 186 projects through the reaction disc 188 and base means 189 into the second axial bore 124 for engagement with aligning tabs 190 on the stop means 166.

MODE OF OPERATION OF THE PREFERRED EMBODIMENT

During a braking sequence, when an operator applies an input force to pedal 20, push rod 60 will move to allow spring 70 to move face 68 of the poppet assembly 62 against vacuum seat 67 to interrupt communication between the first chamber 30 and bore 56 through passage 76. Further movement of the push rod 60 will move the atmospheric seat 69 away from face 68 to allow air at atmospheric pressure present in bore 56 to enter the rear chamber 32 through passage 86. With air in the rear chamber 32 and vacuum in the front chamber 30, a pressure differential will be created across the wall means 28. This pressure differential will create an operational force which will be transmitted through the hub means 34 to move the piston means 94 in bore 98 of the master cylinder 14. As the first piston 96 moves in the first diameter section 98 a first hydraulic pressure will develop in the pressurizing chamber 104 after the lip seal 102 has moved past compensator port 192. This first hydraulic pressure will be communicated through radial bore 128 into the first axial bore 122 and into the outlet chamber 120 after overcoming resilient spring 138 of the first valve means 130 for communication to the front wheel brakes 16. At the same time spring 200 and the fluid pressure in chamber 120 will move piston 146 to develop a corresponding hydraulic pressure in chamber 148 for operating the rear wheel brakes 18.

The fluid pressure in the outlet or second pressurizing chamber 120 will act on the second piston means to transmit a reaction force into disc 188 to provide an operator of the intensity of the fluid force being transmitted to the wheel brakes 16.

At the same time, the first fluid under pressure will be communicated into the control chamber 176 to act on the first face and the second face of the second valve means 150. Since both the first face and the second face have the first fluid under pressure on one side and the fluid pressure in the relief chamber on the other side, a balance condition is established. As the operator increases the input force through the push rod 60, the pressure differential across wall means 28 will correspondingly increase until the rear chamber 32 is completely filled with air at atmospheric pressure, commonly referred to as "vacuum runout." Any further input from the operator will be transmitted from plunger 66 to move the head 184 sufficiently that the pointed end 186 will engage the star shaped bumper 180. When spring 172 has been overcome, the annular surface 164 will be moved away from the resilient surface 170 to allow a proportionate amount of the first fluid in the first pressurizing chamber 104 to escape into the relief chamber 106. As the pressure in the first pressurizing chamber is being reduced, the output from the wall means 28 will be transferred through the reaction disc 188 to move the second piston 112 in the outlet chamber 120 to develop an additional output force for operating the master cylinder 14.

Upon termination of the input force on the pedal 20, return spring 87 will move the atmospheric face 67 against face 68 to allow vacuum present in chamber 30 to evacuate the rear chamber 32 and again suspend the wall means 28. As the pressure differential across the wall means 28 is reduced, return spring 88 will move piston means 94 out of the first and second pressurizing chambers to allow fluid to be communicated through compensator ports 192 and 200 to replenish any fluid lost during previous brake applications.

I claim:

1. In a power brake apparatus having a servomotor with a control means for transferring an output force of a wall means from a first piston means to a concentric second piston means to produce an additional operational force to activate the wheel brakes in a vehicle in response to a corresponding operator input force, said control means comprising:

a housing having a first bore and a second bore therein, said first piston means being located in said first bore to establish a first pressurizing chamber and a relief chamber, said second piston means being located in said second bore to establish a second pressurizing chamber, said second piston means having a first axial bore and a second axial bore separated by a fixed wall, said second piston means having a first radial bore and a second radial bore located on opposite sides of said fixed wall to permit communication between the first pressurizing chamber and the first and second axial bores, said second piston having a third radial bore for communicating said second axial bore to said relief chamber;

first valve means located in said first axial bore of said second piston means for permitting fluid under pressure to only flow from the first pressurizing chamber into the second pressurizing chamber;

second valve means located in said second axial bore of said second piston means, said second valve means having a cylindrical body with a first face and a second face positioned on opposite sides of said second radial bore to form a control chamber within the second axial bore, said cylindrical body having a passageway through which fluid in the relief chamber is communicated to the first face;

stop means located in said second axial bore of the second piston means between the second radial bore and the third radial bore;

first resilient means located in said second axial bore for urging said second face against said stop means to prevent communication between the control chamber and the relief chamber; and actuator means initially responding to an operator for developing said output force across the wall means of the servomotor which will move the first piston in the first pressurizing chamber and the second piston in the second pressurizing chamber to produce a first pressurizing fluid force, said first pressurized fluid force produced in the first pressurizing chamber being simultaneously transmitted into the first axial bore and the second axial bore of the second piston means for communication to the second pressurizing chamber and to said control chamber, said first pressurized fluid force in the control chamber and the fluid in the relief chamber acting across the first face and the second face of the second valve means to develop pressure differential forces which cancel each other, said first resilient means alone providing the closure force which prevents communication between the control chamber and the relief chamber, said actuator means further responding to the operator to overcome said first resilient means to allow fluid under pressure to be communicated into the relief chamber and permit said output force of the wall means of the servomotor to move the second piston means in the second pressurizing chamber to develop said additional output force.

2. The power brake apparatus, as recited in claim 1, wherein said stop means includes:
sleeve means located in said second axial bore having a resilient face thereon for providing a seat for the second face to seal the control chamber from the relief chamber.

3. The power brake apparatus, as recited in claim 2, wherein said second valve means includes:
first seal means adjacent said second radial bore for preventing said first pressurized fluid force from being communicated along the periphery of the second piston means into the relief chamber.

4. The power brake apparatus, as recited in claim 3, wherein said second valve means further includes:
second seal means adjacent said first face for preventing said first pressurized fluid force from being communicated from the control chamber into the relief chamber.

5. The power brake apparatus, as recited in claim 4, wherein said cylindrical body of the second valve means includes:
bumper means located adjacent said second face through which fluid from the relief chamber can be freely communicated to said passageway to said first face.

6. The power brake apparatus, as recited in claim 5, wherein said second piston means includes:
base means for closing said second axial bore to form a transfer chamber for the fluid which is communicated to the relief chamber, said base means having an axial opening therein through which the actuator means is connected to said second valve means.

7. The power brake apparatus, as recited in claim 6, wherein said actuator means includes:
plunger means moving in response to said operator input force for operating a control valve through which the output force across said wall means of the servomotor is developed; and
stem means connected to said plunger means and extending through said axial opening in said base means into said second axial bore of the second piston means, said stem means moving with said plunger means into engagement with said bumper means to correspondingly move said second face on the cylindrical body away from said resilient face on stop means and allow communication between the control chamber and the relief chamber.

8. The power brake apparatus, as recited in claim 7, wherein said actuator means further includes:
reaction means located between said wall means of the servomotor and the base means of the second piston, said second piston means responding to the fluid pressure force in the second pressurizing chamber to transfer a proportionate reaction force into said plunger means to apprise the operator of the operational force in said second pressurizing chamber.

* * * * *